(12) United States Patent
Cheng

(10) Patent No.: US 10,285,414 B2
(45) Date of Patent: *May 14, 2019

(54) METHOD OF PRODUCING AN AROMATISED FOOD OR BEVERAGE PRODUCT

(71) Applicant: NESTEC S.A., Vevey (CH)

(72) Inventor: Pu-Sheng Cheng, Dublin, OH (US)

(73) Assignee: Nestec S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 15/537,150

(22) PCT Filed: Dec. 15, 2015

(86) PCT No.: PCT/EP2015/079827
§ 371 (c)(1),
(2) Date: Jun. 16, 2017

(87) PCT Pub. No.: WO2016/096877
PCT Pub. Date: Jun. 23, 2016

(65) Prior Publication Data
US 2018/0000109 A1    Jan. 4, 2018

Related U.S. Application Data

(60) Provisional application No. 62/093,790, filed on Dec. 18, 2014.

(51) Int. Cl.
A23F 5/48   (2006.01)
A23L 27/28  (2016.01)
A23C 13/00  (2006.01)
A23L 2/56   (2006.01)

(52) U.S. Cl.
CPC .............. *A23F 5/486* (2013.01); *A23C 13/00* (2013.01); *A23L 2/56* (2013.01); *A23L 27/28* (2016.08); *A23V 2002/00* (2013.01)

(58) Field of Classification Search
CPC ............ A23V 2002/00; A23V 2250/21; A23V 2250/214; A23V 2200/15; A23V 2300/34; A23F 1/10; A23F 5/486
See application file for complete search history.

(56) References Cited

U.S. PATENT DOCUMENTS

| | | |
|---|---|---|
| 3,972,809 A | 8/1976 | Kleeman et al. |
| 4,900,575 A | 2/1990 | Cale et al. |
| 5,087,469 A | 2/1992 | Acree |
| 2015/0272183 A1* | 10/2015 | Westfall ............ A23L 2/56 426/655 |

FOREIGN PATENT DOCUMENTS

| | | | |
|---|---|---|---|
| GB | 2089639 | 6/1982 | |
| WO | WO-9952378 A1 * | 10/1999 | ............ A23F 5/32 |

* cited by examiner

*Primary Examiner* — Hong T Yoo
(74) *Attorney, Agent, or Firm* — K&L Gates LLP

(57) ABSTRACT

The present invention relates to a method of producing an aromatised food or beverage product, wherein an aroma fraction is obtained from a plant extract, said aroma fraction is being contacted with a resin to remove undesired aroma compounds, and the aroma fraction from which undesired compounds have been removed are combined with a food or beverage composition to produce an aromatised food or beverage product.

16 Claims, No Drawings

METHOD OF PRODUCING AN AROMATISED FOOD OR BEVERAGE PRODUCT

CROSS REFERENCE TO RELATED APPLICATIONS

The present application is a National Stage of International Application No. PCT/EP2015/079827, filed on Dec. 15, 2015, which claims priority to U.S. Provisional Patent Application No. 62/093,790, filed on Dec. 18, 2014, the entire contents of which are being incorporated herein by reference.

FIELD OF THE INVENTION

The present invention relates to a method of producing aromatised food and beverage products, wherein undesired aroma compounds are removed.

BACKGROUND

Aroma compounds from plant materials are important constituents or ingredients for many food and beverage products. They may be present in plant materials used for producing a food or beverage product and carried directly over into the food or beverage product, or they may be recovered separately from plant material and added as an ingredient to a food or beverage composition. Well known aroma compounds of importance for the food and beverage industry are e.g. aroma compounds from coffee, tea, and cocoa. Aroma compounds present in plant material ingredients may be lost during processing of the plant material into a food or beverage product, volatile aroma compounds may e.g. be lost during thermal processing steps. To avoid this loss aroma compounds may e.g. be recovered from the plant material before the processing steps that leads to their loss, or during the initial processing, and may be added back after the processing steps which would otherwise have led to the loss of said aroma compounds. Methods for doing this are e.g. well known in the production of soluble coffee. During soluble coffee production coffee beans are extracted with water at elevated temperatures, e.g. up to between 120 and 180° C., which would normally lead to a loss of volatile aroma compounds that are important for the final soluble coffee products. These aroma compounds may be recovered from the coffee beans before the high temperature extraction, e.g. by steam stripping of the coffee beans, and may then be added back to the coffee extract after the high temperature extraction. Such methods are e.g. disclosed in WO 01/13735 and WO 99/52378. However, in some instances such methods may also recover aroma compounds that are undesired in the final product. For example, the volatile aroma fraction of roasted coffee beans, especially roasted Robusta coffee beans, contains some aroma compounds which may impart undesired aroma notes to the final product. The volatile fraction of roasted Robusta coffee bean aroma may e.g. impart notes to a final soluble coffee product that are often characterised as "harsh" or "rubber", "woody", "earthy", "chemical" or "phenolic" notes. There is thus a need for methods of selectively removing such undesired compounds from plant material aromas, specifically from coffee aroma. Such methods would allow an improvement of the aroma of food and beverage products comprising aroma derived from plant material. Such methods may, for example, be used to improve the aroma of food and beverage products, e.g. soluble coffee products, comprising aroma derived from roasted robusta coffee beans. This could e.g. allow the use of higher proportions of robusta coffee beans in coffee blends used for producing soluble coffee without imparting the undesired aroma notes of robusta coffee to the final product.

Consequently, it is an object of the present invention to provide methods for producing aromatised food and beverage products wherein undesired aroma fractions are removed from plant material derived aroma fractions. Specifically, it is an object to provide methods for producing aromatised food and beverage products comprising coffee aroma, wherein undesired aroma compounds are removed from the coffee aroma. A further object is to provide methods for producing a food or beverage product, e.g. a soluble coffee product, comprising aroma from roasted robusta coffee beans, wherein undesired compounds are removed from the roasted robusta coffee bean aroma.

SUMMARY OF THE INVENTION

The inventors have found that undesired aroma compounds can be removed from plant extracts by contacting an aroma fraction of a plant extract with a resin. Accordingly, the present invention relates to a method of producing an aromatised food or beverage product, the method comprising: a) collecting an aroma composition from a plant material by stripping of the plant material with a gas; b) contacting said aroma composition with a resin to remove undesired aroma compounds; c) separating said aroma composition from which undesired aroma compounds have been removed from the resin; and d) combining said aroma composition from which undesired aroma compounds have been removed, with a food or beverage composition.

DETAILED DESCRIPTION OF THE INVENTION

As understood herein, a plant material is any material from any plant that may be used for recovering aroma compounds. A plant material may e.g. be stem, leaf, root, flower, flower buds, fruits and/or seeds of a plant. A plant material, as understood herein, includes an extract of a plant, e.g. an extract of stem, leaf, root, flower, flower buds, fruits and/or seeds of a plant. Suitable plants are e.g. coffee (*Coffea*), e.g. Arabica coffee (*Coffea arabica*), Robusta coffee (*Coffea canephora*); tea (*Camellia sinensis*); chicory (*Cichorium intybus*); and cocoa (*Theobroma cacao*). Plant material may e.g. be selected among coffee beans, coffee extract, tea leaves, cocoa, tea extract, fruit, cocoa extract and fruit juice. In a preferred embodiment of the invention a plant material is derived from a coffee plant, in a further preferred embodiment a plant material is coffee bean, preferably roast and ground coffee beans, or an extract thereof. Roast and ground coffee beans may e.g. be Arabica coffee beans, Robusta coffee beans, or a blend thereof. In a preferred embodiment a plant material is a blend of roasted Arabica and Robusta coffee beans, preferably comprising between about 5% and 100% Robusta coffee beans by weight, more preferably between about 15% and 100% Robusta coffee beans by weight, or an extract thereof.

According to the process of present invention, aroma is collected from a plant material by stripping of a plant material with a gas such as e.g. steam. The plant material may be treated in any suitable way to facilitate the release of the desired aroma compounds, the plant material may e.g. be cut, milled or ground into smaller pieces to increase the surface from which aroma compounds may be released, and/or the plant material may be extracted with a liquid, e.g. water, and the aroma fraction may be recovered from the liquid extract. The plant material may be subjected to heating and reduced pressure to facilitate the release of volatile aroma compounds. If the plant material is roasted coffee beans, the aroma may e.g. be collected as grinder gas during grinding of the roasted coffee beans; by stripping aroma from an aqueous slurry or extract of roast and ground coffee beans, and/or by stripping of the roast and ground coffee beans, e.g. with steam. Methods for stripping aroma from roast and ground coffee beans are well known in the art, e.g. from WO 01/13735 and WO 99/52378.

According to the method of the invention, the aroma may be condensed to provide a liquid aroma fraction. The condensation brings all, or part, of the aroma and any water vapour in the gas obtained from stripping unto the liquid form. The resulting liquid will comprise aroma compounds that have been stripped into the gas phase and are condensed together with any water present in the gas. Condensation may be performed by any suitable method, e.g. by cooling and/or compression. Methods of condensing water vapour from gasses is well known in the art, and may include setting the gas under pressure in a compressor and/or cooling the gas in a heat exchanger.

During the condensation step, part of the aroma may not be condensed and remain in the gaseous state. This remaining gas may be subjected to one or further condensation steps to produce one or further aroma fractions. These further aroma fractions may be combined with the liquid aroma fraction obtained by the first condensation step, or may be used for other purposes.

Condensation of the aroma composition may be performed before or after the contact with resin.

The aroma composition collected from the plant material is contacted with a resin to remove undesirable aroma compounds. By contacting the aroma composition with a resin part of the aroma compounds present in the aroma composition will be adsorbed to the resin, including undesirable compounds, and thus removed from the aroma composition. If the plant material is roast and ground coffee beans, undesirable compounds that may be removed are e.g. Furans, Pyrroles and/or Thiols, such as e.g. 2-(2-Furylmethyl)-5-methylfuran, 2,2'-Methylenedifuran, 1-Benzofuran, 1-ethyl-1h-pyrrole, thiophene, 2-[(Methylsulfanyl)methyl]furan, and/or 2-methylfuran. Undesirable aroma compounds in coffee aroma, especially derived from roast Robusta coffee beans, have been found to be able to impart undesired aroma notes to the final food or beverage product, such as "harsh" or "rubber", "woody", "earthy", "chemical" or "phenolic" notes.

Any suitable method for contact of the aroma fraction with a resin may be used, such methods are well known in the art. For example, the contact can be done by mixing the resin with aroma solution or by passing aroma steam through a packed bed of resin.

The aroma composition may be in gaseous or liquid form when contacted with the resin. The resin to be used in the method of the invention is preferably a hydrophobic resin. Furthermore, the resin is preferably non-ionic. Examples of suitable commercial resins are e.g. AMBERLITE™ FPX 66, AMBERLITE™ FPX 68, DOWEX™ OPTIPORE™ SD-2, and AMBERLITE™ XAD series resins (all from The Dow Chemical Company, Michigan, USA).

In one embodiment only part of the aroma composition is contacted with a resin. The remaining part may e.g. be discarded, or may e.g. be combined with the part that is contacted with a resin, after the contact. By contacting only part of the aroma composition with resin, and recombining the contacted and un-contacted parts, the amount of aroma compounds that are removed may be controlled.

As a result of contacting the aroma composition with resin to remove undesirable compounds, an aroma composition from which undesirable compounds have been removed is produced. Said aroma composition from which undesirable compounds have been removed is combined with a food or beverage composition to produce an aromatised food or beverage product. The aroma composition from which undesirable compounds have been removed is preferably in liquid form when being combined with a food or beverage composition. The aroma composition from which undesirable compounds have been removed is preferably oil free when being combined with a food or beverage composition. By a food or beverage composition is meant any composition suited for forming an aromatised food or beverage product by addition of said aroma composition from which undesirable compounds have been removed. A food or beverage composition may e.g. be a coffee product, such as e.g. a soluble coffee extract; a tea product, such as e.g. a soluble tea extract; a creamer composition, such as e.g. a coffee and/or tea creamer; a cocoa product, such as e.g. a cocoa powder, cocoa suspension and/or a cocoa extract; a dairy product, such as e.g. milk, yoghurt, cream, ice cream and/or cheese; a dessert product, such as e.g. a mousse or pudding; and/or a baked product, such as e.g. bread or cake.

In a preferred embodiment, the plant material is roast and ground coffee beans and the aroma composition from which undesired aroma compounds have been removed is combined with a coffee extract in step d), to produce an aromatised coffee extract.

In one embodiment, the method of the invention further comprises drying the aromatised food or beverage product to produce a dried aromatised food or beverage product. Drying may be performed by any suitable method known in the art, e.g. freeze drying, spray drying, or roller drying. If the aromatised food or beverage composition is a soluble coffee extract, drying is preferably performed by spray drying or freeze drying.

A preferred embodiment of the invention is a method for producing an aromatised soluble coffee product, the method comprising:

a) collecting an aroma composition from roast and ground coffee by stripping of the roast and ground coffee with steam;

b) condensing the aroma composition collected from the roast and ground coffee to produce a liquid aroma fraction;

c) contacting said liquid aroma fraction with a resin to remove undesired aroma compounds;

d) separating said liquid aroma fraction from the resin; and e) combining said liquid aroma fraction from which undesired aroma compounds have been removed, with a soluble coffee extract;

wherein the roast and ground coffee from which aroma is collected comprised at least 5% robusta coffee by weight.

EXAMPLES

Example 1

Aqueous coffee aroma was stripped from wetted roast and ground 100% Robusta coffee and condensed, using the method disclosed in WO 01/13735. Following aroma removal two product streams were obtained, wetted stripped coffee grounds and an aqueous aroma (distillate).

The stripped wetted roast and ground coffee was extracted with water by the method disclosed in EP 0826308 to produce an aqueous coffee extract. The extract was then clarified using a centrifuge to remove insoluble sediment and evaporated to obtain a concentrate of approximately 56% soluble coffee solids.

Amberlite FPX 66 resin (The Dow Chemical Company, Michigan, USA) was cleaned with water and kept moist (without excess water) before using.

5 portions distillate of 30 g each was distributed into 5 vials. Cleaned resin was added into the vials in the following amounts:

| Vial | Amount of resin | % of resins in distillate (by weight) |
| --- | --- | --- |
| 1 | Control, no resin | 0 |
| 2 | 0.0383 g | 0.13% |
| 3 | 0.0741 g | 0.25% |
| 4 | 0.1425 g | 0.48% |
| 5 | 0.2924 g | 0.97% |

The vials were closed and left for 30 minutes during which time they were shaken by hand from time to time, after which time the resin was removed from the samples by filtration.

Each distillate was mixed with the obtained coffee extract in an amount corresponding to the stoichiometric ratio between aroma and soluble coffee solids in the original roast and ground coffee beans. The mixture of aroma and coffee extract was diluted to a concentration of 1.2% coffee solids (by weight) by addition of hot water prior to tasting.

Tasting

Tasting of the samples showed that that Robusta characters (Robusta aroma and flavor) decreases as the concentration of Resin increase. Starting at the level of 0.25% resin, there is a clear reduction in Robusta aroma character and the samples had a more pleasant less harsh and more Arabica like character.

The invention claimed is:

1. A method of producing an aromatised food or beverage product, the method comprising:
   a) collecting an aroma composition from a plant material selected from the group consisting of (i) roast and ground coffee and (ii) coffee extract by stripping of the plant material with a gas;
   b) contacting the aroma composition with a non-ionic hydrophobic resin to remove undesired aroma compounds selected from the group consisting of furans, pyrroles, thiols and mixtures thereof;
   c) separating the aroma composition, from which the undesired aroma compounds selected from the group consisting of furans, pyrroles, thiols and mixtures thereof have been removed, from the resin; and
   d) combining the aroma composition, from which the undesired aroma compounds selected from the group consisting of furans, pyrroles, thiols and mixtures thereof have been removed, with a food or beverage composition to form the aromatised food or beverage product.

2. The method of claim 1 further comprising condensation of the aroma composition after step a) and before step b).

3. The method of claim 1 further comprising condensation of the aroma composition after step c) and before step d).

4. The method of claim 1 wherein the aroma composition, from which the undesired aroma compounds selected from the group consisting of furans, pyrroles, thiols and mixtures thereof have been removed, is oil-free when combined with the food or beverage composition.

5. The method of claim 1 wherein the contacting of the aroma composition with the non-ionic hydrophobic resin comprises at least one step selected from the group consisting of (i) mixing the non-ionic hydrophobic resin with the aroma composition and (ii) passing the aroma composition as steam through a bed of the non-ionic hydrophobic resin.

6. The method of claim 1 further comprising drying the aromatised food or beverage product to produce a dried aromatised food or beverage product.

7. The method of claim 1, wherein the stripping of the plant material with a gas comprises stripping aroma from the plant material with steam.

8. The method of claim 1, wherein the plant material comprises coffee extract.

9. The method of claim 1 wherein the plant material is roast and ground coffee beans.

10. The method of claim 9, wherein:
   the aroma composition, from which the undesired aroma compounds selected from the group consisting of furans, pyrroles, thiols and mixtures thereof have been removed, is an aqueous aroma containing liquid;
   the food or beverage composition comprises a coffee extract; and
   the aromatised food or beverage product is an aromatised coffee extract.

11. The method of claim 10, wherein the coffee extract in step d) is an aqueous extract of roasted coffee beans and has been concentrated to a solids content of at least 10% before being combined with the aroma composition from which the undesired aroma compounds selected from the group consisting of furans, pyrroles, thiols and mixtures thereof have been removed.

12. The method of claim 10, wherein the coffee extract in step d) is an aqueous extract of roasted coffee beans and has been produced from roasted coffee beans comprising at least 5% by weight of robusta coffee beans.

13. The method of claim 9, wherein:
   the aroma composition, from which the undesired aroma compounds selected from the group consisting of furans, pyrroles, thiols and mixtures thereof have been removed, is an aqueous aroma containing liquid;
   the food or beverage composition comprises a creamer composition; and
   the aromatised food or beverage product is an aromatised creamer composition.

14. The method of claim 9, wherein the aroma composition is collected from roast and ground coffee beans comprising at least 5% by weight of robusta coffee beans.

15. The method of claim 1, wherein:
   the plant material is roasted and ground coffee,
   the stripping of the plant material with the gas forms (i) an aqueous aroma distillate that is the aroma composition and (ii) wetted stripped grounds, and
   the method further comprises extracting the wetted stripped grounds with water to produce an aqueous coffee extract and concentrating the aqueous coffee extract to obtain the food or beverage composition with which the aroma composition is combined.

16. The method of claim 1, wherein the undesired aroma compounds removed from the aroma composition by the contacting with the non-ionic hydrophobic resin comprise furans, pyrroles and thiols.

* * * * *